(12) United States Patent
Dyche, Jr. et al.

(10) Patent No.: US 11,321,544 B2
(45) Date of Patent: May 3, 2022

(54) FORK CHAIN PRODUCT LABEL AND METHOD OF USE

(71) Applicant: AVERY DENNISON RETAIL INFORMATION SERVICES LLC, Mentor, OH (US)

(72) Inventors: George Dyche, Jr., Mason, OH (US); Julie Vargas, San Antonio, TX (US)

(73) Assignee: Avery Dennison Retail Information Services LLC, Mentor, OH (US)

(*) Notice: Subject to any disclaimer, the term of this patent is extended or adjusted under 35 U.S.C. 154(b) by 0 days.

(21) Appl. No.: 16/678,193

(22) Filed: Nov. 8, 2019

(65) Prior Publication Data

US 2020/0151401 A1    May 14, 2020

Related U.S. Application Data

(60) Provisional application No. 62/757,831, filed on Nov. 9, 2018.

(51) Int. Cl.
*G06K 7/00* (2006.01)
*G06K 19/07* (2006.01)
(Continued)

(52) U.S. Cl.
CPC ....... *G06K 7/0008* (2013.01); *G06K 19/0723* (2013.01); *G06Q 10/06* (2013.01);
(Continued)

(58) Field of Classification Search
CPC .. G06K 19/0723; G06K 7/0008; G06Q 10/06; G06Q 10/08; G06Q 10/0833; G06Q 30/018; G08B 13/2462; H04L 9/0637
See application file for complete search history.

(56) References Cited

U.S. PATENT DOCUMENTS

2017/0147975 A1* 5/2017 Natarajan ............ G05D 1/0676
2017/0228742 A1  8/2017 Aljawhari
(Continued)

FOREIGN PATENT DOCUMENTS

JP   2010-211479   9/2010
JP   2017/054477   3/2017
(Continued)

OTHER PUBLICATIONS

PCT/US2019/60420 International Search Report, dated Feb. 26, 2020 (Year: 2020).*
(Continued)

*Primary Examiner* — Nader Bolourchi
(74) *Attorney, Agent, or Firm* — Avery Dennison Retail Information Services LLC

(57) ABSTRACT

A blockchain-based "fork chain" system and method for tracking RFID labels and other products. The method ensures authenticity at each step, and that the digital identity of a physical item can be accurately verified. The method may include: (a) receiving and verifying RFID chips manufactured by a trusted supplier; (b) creating a blockchain related to the chips; (c) assembling the chips into a roll inlay, the inlays into a carton and the cartons into a pallet; (d) updating the blockchain with roll, carton, and pallet codes; (e) taking receipt from a specific trusted individual and adding verification to the blockchain; and (f) activating a digital identity. GPS information may be associated with each step in the process to ensure that the product is properly present at the appropriate manufacturing and encoding locations. Once a digital identity is produced for the product, it may be added to by subsequent users.

14 Claims, 5 Drawing Sheets

(51) Int. Cl.
*G06Q 10/06* (2012.01)
*G06Q 10/08* (2012.01)
*G08B 13/24* (2006.01)
*H04L 9/06* (2006.01)

(52) U.S. Cl.
CPC ......... *G06Q 10/08* (2013.01); *G08B 13/2462* (2013.01); *H04L 9/0637* (2013.01)

(56) References Cited

U.S. PATENT DOCUMENTS

| | | | |
|---|---|---|---|
| 2018/0012311 A1* | 1/2018 | Small | G06Q 30/0185 |
| 2018/0114168 A1 | 4/2018 | Ryan | |
| 2018/0117446 A1* | 5/2018 | Tran | G06Q 20/389 |
| 2018/0189528 A1* | 7/2018 | Hanis | G06Q 10/087 |
| 2018/0211207 A1* | 7/2018 | Maijala | G06Q 10/087 |
| 2018/0276597 A1* | 9/2018 | Fuller | H04L 9/3247 |
| 2018/0284093 A1 | 10/2018 | Brown et al. | |
| 2018/0365633 A1 | 12/2018 | Hanis et al. | |
| 2019/0114584 A1* | 4/2019 | Toohey | G06K 19/07758 |

FOREIGN PATENT DOCUMENTS

| | | |
|---|---|---|
| WO | 2017/060824 | 4/2017 |
| WO | 2017/091685 | 6/2017 |
| WO | 2017/165909 | 10/2017 |
| WO | 2018/172966 | 9/2018 |

OTHER PUBLICATIONS

PCT/US2019/60420 Written Opinion of The International Searching Authority (Year: 2020).*
International Preliminary Report on Patentability dated Aug. 10, 2021 issued in corresponding IA No. PCT/US2020/018330 filed Feb. 14, 2020.
International Search Report and Written Opinion dated Jun. 30, 2020 issued in corresponding IA No. PCT/US2020/018330 filed Feb. 14, 2020.
International Search Report and Written Opinion dated May 27, 2020 issued in corresponding IA No. PCT/US2020/024668 filed Mar. 25, 2020.
International Preliminary Report on Patentability dated Sep. 28, 2021 issued in corresponding IA No. PCT/US2020/024668 filed Mar. 25, 2020.
Mokhsin et al., The Inventory Management System Using RFID: Requirements Management. International Journal of Advanced Research in Computer Science. Udaipur vol. 1, Issue 2, Jul. 2021. (Year: 2010).

* cited by examiner

200

FORK CHAIN PRODUCT LABEL AND METHOD OF USE

CROSS REFERENCE

This application claims priority from U.S. Provisional Patent Application Ser. No. 62/757,831 filed on Nov. 9, 2018, which is incorporated herein by reference in its entirety.

BACKGROUND

The present invention relates generally to a blockchain based "fork chain" system and method of use for tracking products such as RFID labels and associating the same with other products to create a digital identity. Accordingly, the present specification makes specific reference thereto. However, it is to be appreciated that aspects of the present invention are also equally amenable to other like applications and devices.

Businesses have oftentimes struggled with the practice of tracing products from their point of origin all the way to retail and, in some instances, beyond. The inability of a business to trace its products can often lead to significant cost expenditures, particularly when a problem is identified with a small number of products that forces the business to issue a product wide recall or halt sales until all noncomplying products can be identified and the appropriate corrective action taken.

Some of the best examples of this come from the field of food product safety. For example, new food product safety laws have given the government a great deal of additional latitude to enforce recalls on certain food products. Likewise, new practices by physicians, scientists and public health officials have made it much easier to identify the source of a particular outbreak or contamination. As a result, both the Food and Drug Administration (FDA) and the U.S. Department of Agriculture (USDA) have recalled food products suspected of contamination or other defects at ever-increasing rates in the last several years, and the recalls can be massive undertakings. For example, in April of 2018, the FDA announced a recall of approximately 206 million eggs over salmonella-contamination concerns, thereby affecting hundreds, if not thousands, of retailers including Walmart® and Food Lion®. Likewise, these types of recalls can also occur frequently. For example, in the summer of 2018, products including RITZ® crackers, Goldfish® and Swiss Rolls™ were all recalled in the span of one week, and McDonald's® salads and Kellogg's® Honey Smacks™ were also subject to recalls just a little while beforehand.

Some extremely disruptive recalls have also come about under circumstances where it is more difficult to identify the specific source of the outbreak or problem that led to the recall. For example, in 2006, a major *E. coli* outbreak related to contaminated spinach occurred and infected almost 200 people. Unfortunately, it took almost two weeks to identify the specific farm from which the contaminated spinach originated from and, during said period, retailers stopped selling spinach all over the United States until the farm that caused the outbreak was identified. This unfortunate outbreak not only resulted in a significant number of individuals becoming ill, but it also created a significant loss of revenue for retailers, distributors and spinach farmers nationwide. Additionally, the delay in identifying the source of the contaminated spinach resulted in additional consumers who were not aware of the recall being exposed to the contaminated spinach, and potentially becoming ill.

One of the reasons why it typically takes so long to identify the source of a contaminated product, such as a food product, is due to the complicated supply chain process that is managed by a network of growers, wholesalers, distributors and/or retailers, almost none of whom have information about their entire supply chain readily available. More specifically, electronic data generally only makes it one or two steps downstream in the supply chain. For example, a retailer might know who its distributor is, but not the ultimate source of the product, and a distributor might know the identity of its supplier, but not the identity of the supplier's supplier, all of which generally must be identified manually. The problem is further complicated when one takes into consideration the extremely high number of products and locations that some of the larger retailers possess. For example, retailers like Walmart may have over 50,000 products on the shelves at more than 6,000 different store locations, sourced from thousands of different vendors, thereby making the tracking of a particular product a logistical nightmare. As such, even highly sophisticated retailers can take around a week or more to identify the origin of a product even under the most difficult or time sensitive of circumstances.

Of course, the food and beverage industry is not the only industry in which businesses may need to trace their products to their point of origin. Another example of an industry with such a need is the transportation industry, and particularly the airline industry. For example, if an aircraft experiences some type of catastrophic failure, such as a turbine explosion, it can be extremely important to quickly identify the point of origin for the component so that, if the part failed due to some sort of manufacturing defect, any other similar components can be quickly identified and taken out of service, thereby preventing further catastrophes from occurring. This can also be an issue with many other types of machine parts, from consumer goods to industrial equipment, though aircraft and other transportation vehicles have some of the highest risks of catastrophic failure leading to significant loss of life.

Additionally, faulty or defective components can be extremely difficult to identify and source. For example, individual components may not be separately marked with identifying information and, oftentimes, manufacturers of each successive component in a chain (for example, an individual fan blade, the other components of a turbine assembly, an engine, and an aircraft as a whole may all have different manufacturers) may not have information on the sources of every other component in their assembled products. As a result, attribution of fault after an accident is made much more difficult. Likewise, the procedures that must be undertaken in order to ensure the safety of such components are made much more complex and expensive than they might otherwise have been with an appropriate tracking system in place.

Finally, product tracking concerns aren't just limited to businesses in the product supply chain. Customers, with good reason, may have greater peace of mind if they can be assured that the products that they have purchased are not subject to recall anywhere, and have been safely vetted at every stage of the production process. This has become an issue of increasing concern for customers because of the relatively high number of counterfeit or poor-quality goods manufactured abroad, which have contributed to a large number of health scares in the United States. For example, in one year alone, toy maker Mattel® had to recall nearly one million toys due to the use of lead based paint in certain foreign factories, toy train manufacturer Rc2 had to recall 1.5 million toys for the same reason, half a million radial tires were recalled by an American distributor after a safety feature was unilaterally eliminated by a foreign factory, and—in the scandal that attracted the most news—Spin Master's™ Aqua Dots products contained a toxic contaminant that hospitalized a number of children. As such, many customers are clamoring for a way to guarantee that the products that they purchase are authentic and free of harmful substances and other defects.

Customers also have an interest in ethical sourcing of products or the use of sustainable manufacturing practices, which has resulted in customers having a preference for ethical and/or sustainable products. Further, this customer preference has resulted in increased brand loyalty toward companies that can guarantee that they are engaging in sustainable practices and ethical sourcing.

Therefore, there is a long felt need in the art for the ability to better track products, and the various components contained therein, from point of origin to retail and beyond. There is also a long felt need in the art for a blockchain-based "fork chain" system and method that creates a digital identity for a product, and enables a user to accurately verify the digital identity of the product throughout the process. More specifically, the method may include receiving and verifying integrated circuit chips manufactured by a trusted supplier, assembling the chips into a roll inlay, assembling the roll inlays into cartons and the cartons into pallets and updating the blockchain with roll, carton, and pallet codes, taking receipt from a specific trusted individual and adding verification to the blockchain, and activating a digital identity. Global positioning system (GPS) information may also be associated with each and every step in the process to ensure that the product is properly present at the appropriate manufacturing and encoding locations, and at the appropriate time. Once a digital identity is produced for a particular product, it may be added to or otherwise revised by subsequent use, as appropriate.

SUMMARY

By way of background, a blockchain is a growing list of records, called blocks, that are linked using cryptography. More specifically, each block preferably contains a cryptographic hash of the previous block, a timestamp, and transaction data. By design, a blockchain is resistant to modification of the data. It is an open, distributed ledger that can record transactions between two parties efficiently and in a verifiable and permanent way. For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority.

One application of blockchain technology comes in the form of product tracking. More specifically, blockchain can be used to establish the point of origin for a particular product, and can also be used to trace the product throughout its useful life while enabling a clear transfer of ownership to take place at each stage of the product's lifecycle. Anyone with access to the blockchain associated with a particular product may be able to identify a point in the product's history indicating where the product came from, who owned it last, and so forth, provided that some effective technique is established for guaranteeing that the blockchain is updated at every step.

However, there are certain limitations with attempting to use blockchain in this manner More specifically, a blockchain record is, by necessity, electronic, so if the electronic record cannot be effectively associated with the physical product, it is of limited use. Likewise, if it cannot be guaranteed that the blockchain record will actually be updated every time the product changes hands or location, it is ineffective at establishing an accurate record of the supply chain. Nonetheless, if these limitations can be overcome, the technology may also be used to measure or track other product attributes, such as time and temperature for tracking the safety of the products that are associated with the tags. There can also be anonymous or registered ownership and transfer of ownership as part of the encryption scheme, as discussed infra, as well as communication linkages as products move along the supply chain.

One solution for ensuring that blockchain record information remains associated with the product in question, and for ensuring that the blockchain record information is accurately updated, comes from radio-frequency identification (RFID) technology. Generally stated, radio-frequency identification is the use of electromagnetic energy to stimulate a responsive device (known as an RFID "tag" or transponder) to identify itself and, in some cases, provide additional information and/or data stored in the tag. RFID tags typically comprise a semiconductor device commonly referred to as the "chip", upon which are formed a memory and an operating circuitry, which is connected to an antenna. Typically, RFID tags act as transponders, providing information stored in the chip memory in response to a radio frequency interrogation signal received from a reader, also referred to as an interrogator. In the case of passive RFID devices, the energy of the interrogation signal also provides the necessary energy to operate the RFID tag device.

RFID tags may be incorporated into or attached to articles that a user wishes to later identify and/or track. In some cases, the RFID tag may be attached to the outside of the article with a clip, adhesive, tape, or other means and, in other cases, the RFID tag may be inserted within the article, such as being included in the packaging, located within the container of the article or plurality of articles, or sewn into a garment. Further, RFID tags are manufactured with a unique identification number which is typically a simple serial number of a few bytes with a check digit attached. This identification number is typically incorporated into the RFID tag during its manufacture. The user cannot alter this serial/identification number, and manufacturers guarantee that each RFID tag serial number is used only once and is, therefore, unique. Such read-only RFID tags typically are permanently attached to an article to be identified and/or tracked and, once attached, the serial number of the tag is associated with its host article in a computer database.

According to an exemplary embodiment of a fork chain system, RFID technology can provide a unique identifier that can be mapped to a product, thereby allowing the supply chain to become more efficient, saving time and increasing inventory accuracy. As such, an end-to-end system can be implemented that leverages the use of RFID technology to establish a unique identifier, verify the digital identity of a physical item, and associate the digital identifier with the physical item. The system may then, in certain exemplary embodiments, include additional features directed at ensuring that the data associated with the blockchain is trustworthy. Further, when it comes to the maintenance of such a record, the "garbage in, garbage out" principle applies, such that, if the digital identity creation, association, and/or activation of the physical item—initially or at each successive stage in the supply chain—is not trusted, then the downstream blockchain application could also be compromised.

A "fork chain" system may also function to provide a "truth" layer to users by combining RFID technology and biometrics. For example, according to one embodiment of a fork chain, a "fork" may have several "prongs," each belonging to a separate chain that may be validated and connected to a particular brand owner chain, which may then be connected to a retailer chain. As such, a "fork chain" may be a blockchain derivative, wherein only a small number of people add to a collective ledger; the more limited "fork" may specifically service a particular brand, particular retailer, or any other type of entity to suit user need and/or preference.

According to an exemplary embodiment, the overall process or method by which a fork chain system may be implemented may be broadly understood as having four main steps, though in some exemplary embodiments, these main steps may be subdivided into smaller steps, and may be performed simultaneously or in any order, such as may be desired.

In a first step, the labels that may be used in conjunction with a fork chain system are manufactured. To manufacture the authenticated labels, the underlying RFID circuits are manufactured by a trusted supplier, with the trustworthiness of the supplier based on any method as would be understood in the art. As these RFID circuits are assembled, certain records relating to the manufactured circuits may be integrated into a blockchain by the chip supplier, including any or all of: (a) the batch identifier (ID) of each of the chips, (b) the wafer ID, (c) the unique tag identification memory associated with and containing data about each chip (which may, in Gen 2 RFID tags, be referred to as a TID), (d) the unique brand identifier associated with the chip supplier, and (e) a variable counter associated with the RFID chip and indicating its position in a production run. Other data may also be stored on the blockchain related to the RFID chip, which may be provided along with the chip to the chip recipient from the trusted chip manufacturer or supplier.

Once the RFID chips have been manufactured and delivered from the chip supplier, the chips may then be integrated into label rolls. Nonetheless, it is also contemplated that each of these steps may be performed by the same entity or by different entities, such as may be desired. For example, RFID labels may be manufactured into rolls such that the chips are integrated into each label on the roll. As part of this manufacturing process, additional information may be added to the blockchain for each RFID tag or chip in each label on the roll. Such additional information may include, for example, a unique roll ID for each roll of labels, an indication of whether the chip or label has been tested as being functional or nonfunctional (i.e., "good" or "bad") or whether the chip or label has been tested as having an acceptable degree of functionality if multiple degrees of functionality are required, as well as any other information that may be necessary in order to account for all of the chip devices used in the manufacturing of the labels. It is also contemplated that the chips may be tested prior to their integration with the labels, such that functional chips can be identified and used, and so that nonfunctional chips can be identified and properly disposed of. Additionally, each blockchain associated with each chip may be updated, such that the blockchains associated with defective or nonfunctional chips identify those chips as defective or nonfunctional. This may potentially allow the supplier to identify defects, or may allow for variable and dynamic compensation to be provided by the supplier in real time based on the failure rates of their devices, or other such configurations such as may be desired.

Once the RFID labels are manufactured in the form of rolls, they may be assembled into cartons, which may then be assembled into pallets, which may then become the final product shipped to a customer and eventually combined with the end products to be tracked. Accordingly, the RFID tags (or other integrated circuit devices) may be associated with a roll ID associated with the roll of the RFID tag labels, which may be mapped to a particular carton ID based on the carton to which the roll has been added, which may in turn be mapped to a particular pallet ID based on the pallet to which the carton was added. According to an exemplary embodiment, the addition of these values to the blockchains associated with each RFID tag may allow information about the RFID tag to be tracked back to the initial chip ID and wafer ID, should it become necessary to verify the production process of the chip all the way back to the trusted manufacturer or supplier of the RFID labels. This lookup process may likewise be usable in a reverse fashion, such that a roll ID may be associated with a specific set of integrated circuits on the roll, thereby allowing the roll ID to be used in order to identify exactly which RFID chips have been used to form that roll of labels. If, for example, a roll has a particularly high defect rate, the defect rate may be identified and traced back to the supplier of the roll. Likewise, if a roll has a particularly low defect rate, the process allows that supplier to be identified and prioritized for future orders, or may allow for future specifications to be created for other suppliers to be updated to match that target.

Once all such identifiers have been associated with the blockchains associated with each label, a shipment ID may be created that corresponds to a particular shipment. According to an exemplary embodiment, a pallet ID, a case ID, and/or a roll ID may be mapped with a shipment ID (or "ship to" ID), which may combine the pallet, case, and/or roll information with shipment information for a particular customer. Alternatively, as previously mentioned, such a procedure may be performed by one actor performing multiple steps, such that, for example, the same company is producing and then using the labels. In such an exemplary embodiment, a shipment ID may instead identify a shipment location, such as a production facility in which the labels will be used, such as may be desired.

Once the customer or other recipient has received the labels, the customer may verify receipt of the labels through the blockchains associated with each label. Verification ensures that the production and shipment history of the label is fully traceable from the initial stages of production of the chip to the customer of the label. It is also contemplated to have situations wherein the labels are only partially completed, or are finished elsewhere, which may also be specified in the production and shipment history of the label. For example, blank labels, intended to be printed upon later or intended to be integrated within a product without any sort of printing being applied thereto, may be provided to one customer, while in another case it may be desirable to have the labels be printed upon and encoded before shipment. In such cases, wherein the labels may be printed and encoded prior to shipment, additional information such as the electronic product code (EPC) of the RFID tag may be integrated with the blockchain at this stage such as may be desired. For example, the EPC may be added to the label blockchain ledger prior to the label being associated with a roll ID, a case ID, and so forth.

Once the customer (or production facility or other destination) has received the rolls of labels, the second step of the method may begin. In an exemplary embodiment of a fork chain system, the location to which the RFID labels were shipped may first be integrated into the blockchain ledger for each label. The location information may be, for example, a GPS location of the facility or a mailing address, or any other geographical identifier as may be desired. Alternatively, only a simple identifier such as "Location 1" or "LOC_1" "LOC_2," "LOC_3," and so forth may be added, as may be desired. As provided herein, the location information may generally be referred to as an identifier for "LOC_N," which may or may not contain detailed information, such as GPS information or other absolute coordinate information, address information or other relative location information, and so forth. It is also contemplated that the customer may have multiple locations in which the pallets of labels may be shipped. For example, if the customer has a variety of end locations to which the labels may be shipped, the shipment of the labels to these locations may be tracked via blockchain, and each of the customer's locations may host a secure node that may be used to read the product, and verify the receipt of the product and the location of its receipt.

Once the pallet has reached the end location, it may also be desirable to have a specific employee of the company be responsible for inspecting the RFID labels and updating the blockchain ledgers associated with each RFID label. According to an exemplary embodiment, it may alternatively be useful to have a set of authorized employees or agents of the customer or other recipient, or specific devices of the customer (for example, if the customer has an automated receipt process), which may be able to update the blockchain ledgers, as may be desired. In an exemplary embodiment, a blockchain ledger may be updated to show the identifying information for a particular authorizing employee, which may update the ledger to show, for example, "Received by _____" or "Received—Employee 306. In such an exemplary embodiment, once the case ID, pallet ID, and/or roll ID is received, one of the identifiers (such as a roll ID) may be transferred to this individual ID for the employee such that the roll ID or other identifier can be tracked via blockchain. The individual label IDs may also be directly transferred or may be updated directly to include the employee ID information, or may instead simply inherit it from the roll ID information or other identifying information.

Once the individual receives the assigned or commissioned roll ID, the fork chain system may also require that authenticating information be added to the blockchain ledger from the individual. For example, according to an exemplary embodiment, the individual may be provided with a biometric scanner or other biometric information to enable the individual to enter his or her thumbprint to receive delivery of the rolls, generate a code with the biometric information and other information, such as the date and time of receipt, and all of such information may be added to the blockchain ledger for each label (or may be associated with specific IDs such as the roll IDs), as may be desired. Other authentication methods other than, or in addition to, biometrics are also contemplated. For example, in one exemplary embodiment, an individual may provide an encrypted electronic signature to the blockchain ledger to ensure that the RFID labels are provided to a specific accountable individual that can verify himself or herself as an employee through the customer company through whatever authentication measures may be appropriate or desired. Other examples may include a two factor or encrypted authentication on the chip and/or inlay. These could include binary encryption layers in the chip or other component provided on the inlay, such as a sensor or other trigger.

The third step of the method involves the trusted application of the label to a particular product at the point of use. According to an exemplary embodiment of a fork chain system, once a specific roll ID ownership value is assigned or transferred to an individual ID, the individual may then encode certain further information on the blockchain ledgers, optionally with specific hardware, and optionally after performing certain other actions such as may be desired.

For example, according to an exemplary embodiment of the fork chain system, an individual may first use a dedicated hardware system in order to verify the accuracy of each roll ID, as well as any other details stored on the blockchain. By way of further example, the same dedicated hardware system may also be used in order to perform chip testing, such as may be desired, and each RFID tag encoded in each label, or some appropriate selection of RFID tags in the label roll, may be tested in order to ensure that the RFID tags can be properly read. Damaged or defective RFID tags may be removed from the process and the blockchain updated accordingly.

According to an exemplary embodiment, a customer hardware system may incorporate a printer, which may be used to print any variable information on the labels that may be desired. For example, if the labels are blank, the printer may be used to print any and all information on the labels that it may be desired for the labels to have. Alternatively, variable information may be printed on just a portion of the labels in order to supplement unchanged information provided on the labels since the previous step, if the labels were prepared in this manner in the previous step. In a further exemplary embodiment, the label printer used by the customer may be connected to an encoder or another hardware device configured to record the variable data in the blockchain ledgers.

According to an exemplary embodiment, a customer hardware system may further include an encoder, which may be used to encode information in the RFID tag of the label. The encoder may be provided before or after the printer, or may be provided concurrently with the printer in that some printer tasks may be performed beforehand or afterward. For example, RFID labels may be printed upon, encoded, and separated from the web if provided in a continuous format, such as may be desired. The encoded information may then be stored in the blockchain ledger in some form. For example, all of the encoded information may itself be stored in the blockchain ledger, which may allow for the information to be easily accessed by tracing the product's history. In another exemplary embodiment, only a selection of the encoded information, or an indication that the information has been successfully encoded, may be stored in the blockchain such as may be desired.

According to an exemplary embodiment, the customer hardware system may also include a location encoder, which may encode the location at which the label was printed and encoded. The location encoder may be part of the encoder, or may be a separate device, such as may be desired. According to an exemplary embodiment, the location encoder may make a live retrieval of the current location with every encoding (for example, via GPS or other geo-location technologies, such as may be desired) or may encode a predetermined location such as may be desired. For example, in one exemplary embodiment, the address of the factory may be encoded; whereas in another exemplary embodiment, a pre-recorded GPS coordinate or other location indication may be encoded without such location being checked first. The encoded location may then be added to the blockchain, along with the other information associated with the RFID label, in such a manner as to tie it to both the roll ID (and/or the individual label ID) and the individual ID of the customer employee.

According to an exemplary embodiment, it is also contemplated to have a combination printing and encoding machine, or a machine that performs some combination of printing and encoding, such as may be desired. The combination printing and encoding machine may perform the functions of printing, data encoding, and/or location encoding after verifying the individual ID and the roll ID to ensure that each was proper.

According to an exemplary embodiment, it is also contemplated that a customer may be making use of already printed labels (e.g., printed labels that have not yet been encoded), already encoded labels (e.g., encoded labels that have not been printed or which do not feature a finalized print), and/or labels that have already been printed and encoded. In some exemplary embodiments, it is contemplated that printing and encoding may be performed as a part of the manufacturing of the roll, if desired. Alternatively, it is contemplated that a service bureau or other intermediate company may perform the labeling and printing, such as may be desired. Should a service bureau perform any of the intermediate steps, such information may be indicated on the blockchain in a similar matter to the method previously discussed to ensure full accountability at each step in the process. In such an embodiment, the customer may complete the labels as necessary, and then provide additional location encoding, indicating that the labels have been received in whatever form they have been received in, and indicating that the labels have been modified and added to the products as appropriate.

Once the customer (or, again, other production location, such as may be contemplated) has completed the printing and encoding process, an authorized individual at the customer (who may be, for example, a trusted employee of the manufacturing company) may apply the digital identity to the physical product. In one exemplary embodiment of a fork chain system, the rolls may be fully traceable up until this point, with the rolls being assigned to this employee and validated by the printer and encoder machine node. After this point, the focus may be on the individual RFID labels, as the labels may be applied to the actual physical products with which they will be associated, and incorporating such information into the blockchain ledger associated with each product. Chain of custody protocols could also be used to ensure that all the RFID labels are accounted for as part of the process to maintain integrity of the system. User IDs, hardware encryption or other authentication details can also be used.

In a fourth step of the method of the present invention, and in order to ensure that the physical products are properly associated with the RFID tag and with the blockchain ledger associated with that RFID tag, an exemplary embodiment of the fork chain system may have a process for incorporating the two. For example, once a particular physical product is assigned a specific RFID label, or during the manufacturing process, a final time stamp may be applied to the blockchain ledger associated with the RFID tag of the label, corresponding to the time at which the tagged product was scanned and read during the manufacturing process or a time immediately after labeling. This final timestamp may provide for the traceability of the RFID label all the way back through the label supply chain, to the first production of the integrated circuits.

Once this has occurred, the manufacturer may, upon reading the tagged product and time stamp, create a verification report so as to provide the product with a cohesive digital identity. For example, according to an exemplary embodiment, a verification report may include verification of one or more of, or all of, the following: (a) that the RFID labels have come from a trusted source, (b) that the commissioned RFID labels have been provided to the correct manufacturing location, (c) that the RFID labels have been updated by a trusted employee, (d) that the RFID labels have been properly encoded at a defined location, (e) that the RFID labels have been applied to a product at a defined location (by geolocation or otherwise) as overseen by the trusted employee, and (f) that the product's digital identity has been finalized and activated for downstream supply chain uses.

According to an exemplary embodiment, once this persistent digital identity has been created, others may be able to add to the blockchain ledger associated with a particular product, as desired or to suit user preference. For example, once the product has an activated digital identity, it may be updated with timestamp and location information showing that it has been provided to a retailer, timestamp and location information of an original purchase by a first party, information showing that the first party donated the product to, for example, a consignment store, information showing that it was then purchased from the consignment store by a second party, and so on and so forth. In some cases, a product having a digital identity may be updated other than when it changes hands. For example, in an exemplary embodiment, a digital identity of a product may be updated if it is returned or exchanged (e.g., if it is clothing of an improper size), or may even be updated when it is taken to particular places (e.g., a user that travels to a foreign country may have their products "check in" to those foreign countries to show where the products have previously been).

In an exemplary embodiment, the blockchain ledger associated with a particular RFID tag in a label may be combined with a pre-existing blockchain associated with a product, or with any other component of the process. For example, a particular product may be designated by a blockchain ledger associated with the raw materials used to make the product (e.g., fabric used to make clothing). Further, companies providing transportation or providing other labor may also have their own blockchain ledgers indicating what was done and when, which may be reconciled with the blockchain ledger of the RFID tag and/or of the raw materials.

According to an exemplary embodiment whereby a "fork" chain is, in particular, an apparel "fork," one specific prong of the fork chain ledger may contain, for example, apparel trim, tickets, tags, labels, woven components, buttons, zippers, etc. Each of these various components may be validated/verified with RFID to provide for the integrity of the source. In this same exemplary embodiment, another prong may be the material chain, which may guarantee that fabrics have been sourced from non-conflict regions, made from sustainable materials, recycled materials, etc. Another prong of the "fork" may pertain to the source of the labor used to create the product, wherein the labor source is validated to be free of child labor, to have safe working conditions, food, shelter, reasonable hours, etc. Yet another prong of the "fork" relate to transportation, which may, for example, identify that the carriers have not been implicated in illegal activity, such as illegally flagged vessels, or may identify that the carriers do not (or do, depending on preference) support boycotts against particular countries.

In one exemplary embodiment, the use of the "fork" chain may allow products which involve particular companies somewhere in the supply chain to be marketed in specific locations or to specific target demographics. For example, if it is desired to sell a product in a heavily political area, a shipping company may be selected that has made a high-profile endorsement of a particular politician, and the "fork chain" system may ensure that that shipping information is associated with a specific product to be sold in that area. Meanwhile, in another area, another company could be selected for the contract.

Other exemplary embodiments of "fork" chains are also contemplated. For example, it may be desirable to have a similar system for tracking food rather than tracking apparel. In this case, individual prongs might include a labor prong, a farm prong (identifying that the farm is not one that has been linked to any outbreaks, identifying that the produce is authentically organic, and so forth), a transportation prong, and any other similar prongs such as may be desired.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
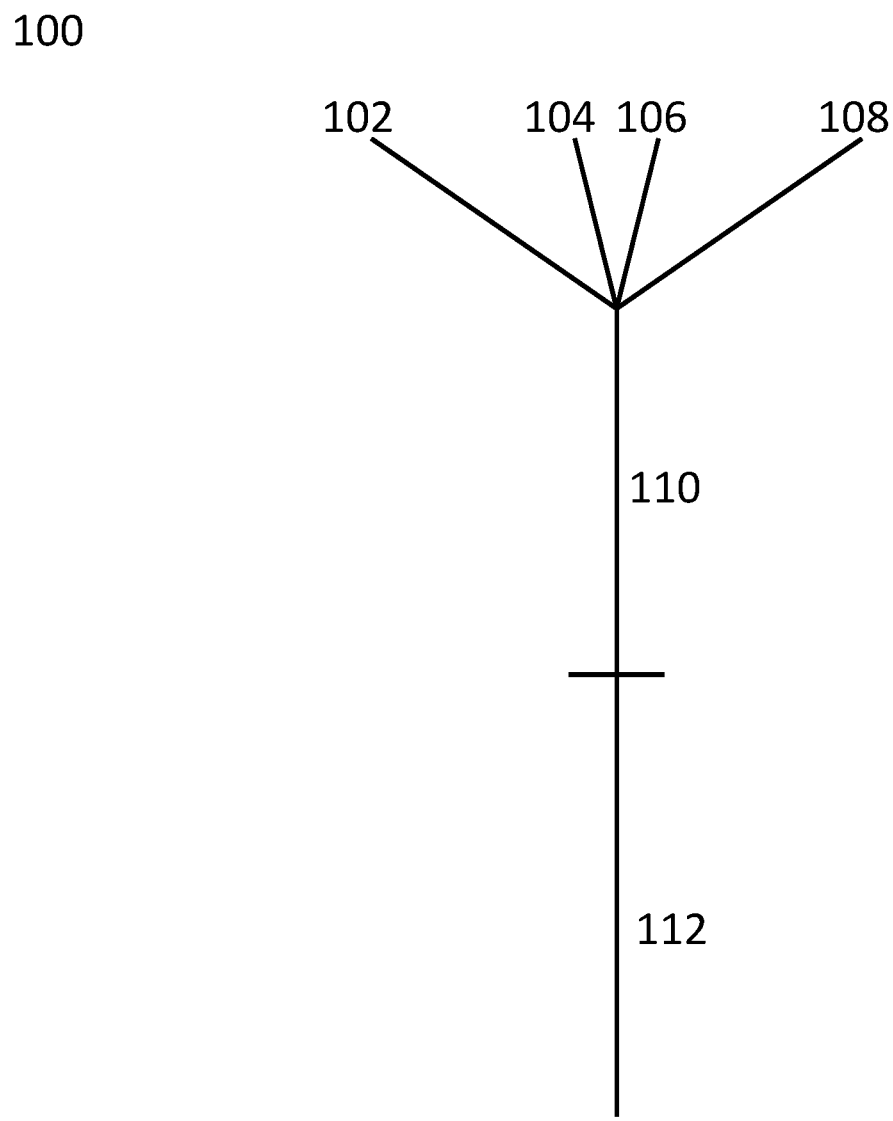
FIG. 1 is an exemplary embodiment of a structure diagram showing a combined fork chain system.

Referring now generally to the Figures, various exemplary embodiments of a fork chain system and method of use are disclosed herein. More specifically, FIG. 1 displays an exemplary embodiment of a structure diagram showing a combined fork chain system 100. As stated above, a fork chain system 100 may have several "prongs," each belonging to a separate blockchain that may be validated and connected to a particular brand owner chain which may then be connected to a retailer chain. As such, a "fork chain" may be a blockchain derivative, wherein only a small number of people add to a collective ledger; the more limited "fork" may specifically service a particular brand, particular retailer, or any other type of entity to suit user need and/or preference. In an exemplary embodiment, the blockchain ledger associated with a particular RFID tag in a label, such as blockchain ledger 102, may be combined with a pre-existing blockchain associated with a product, or with any other component of the process. For example, it may be contemplated to have an additional blockchain ledger associated with the raw materials used to make the product (for example, fabric used to make clothing) 104, a blockchain ledger associated with transportation services 106, and a blockchain ledger associated with manufacturing labor 108, as best illustrated in FIG. 1. Each of the blockchain ledger components 102, 104, 106 and 108 may incorporate specific information regarding their history and the locations at which each event in the history occurred. For example, according to an exemplary embodiment, a blockchain ledger 102 corresponding to the RFID label of a product may provide the history of the product from initial integrated circuit (IC) manufacturing all the way to its combination with the raw materials used to make the product (in whatever form those materials were in at the time, such as a nearly-finished product), which may be tracked through its own blockchain ledger 104 up until the point at which it is combined.

Once the various blockchain ledgers 102, 104, 106 and 108 are combined (e.g., to resemble a fork, as best shown in FIG. 1), it may also be desirable to add certain other information to the combined blockchain ledger as a next step in the fork chain process. For example, according to an exemplary embodiment, branding information 110 may be added to the combined product, after which the product may be distributed to retailers. In connection with the distribution of the product to retailers, retail information 112 may be added to the combined product. In an exemplary embodiment, this may allow the fork chain ledger to be used for such purposes as inventory tracking at the retailer, thereby allowing the retailer to know exactly which products are in stock and where, and allowing the retailer to know how long these particular products have been in stock. This information is extremely valuable to both the retailer and other interested parties upstream in the supply chain, such as the manufacturer. For example, by permitting such information to be passed up the supply chain, a manufacturer or distributor may be able to easily determine, from tracking all of the products having blockchain ledgers that they have been associated with, which products are selling well and which are not, or which are most likely to be returned, resold, donated, etc. This type of invaluable information may also allow for new types of business activity on the part of the manufacturer, distributor, or retailer. For example, a manufacturer of a luxury brand of clothing may sell a limited run of designer clothing at a very low price with the caveat that the clothing cannot be sold or transferred to another retailer, and may make use of the combined ledger system in order to determine if any future transfers are made.

Figure 2:
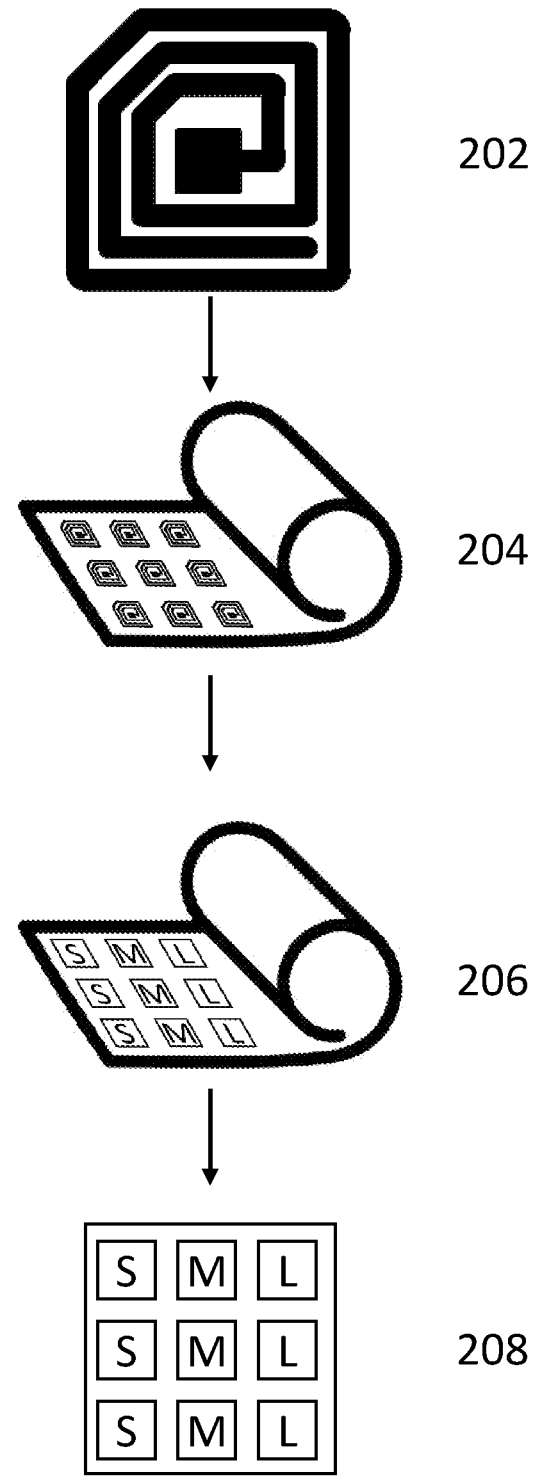
FIG. 2 is an exemplary embodiment of a process flow diagram for the manufacturing of an RFID-equipped label.

FIG. 2 provides an exemplary embodiment of a process flow diagram for the manufacturing of an RFID-equipped label 200. In a first step of the process flow diagram 200, an IC chip 202 may be produced. As chips 202 are assembled, certain records relating to the manufactured chips may be integrated into a blockchain ledger by the chip supplier, including any or all of the following: (a) the batch identifier (ID) of each of the chips 202, (b) the wafer ID, (c) the unique tag identification memory associated with and containing data about each chip 202 (which may, in Gen 2 RFID tags, be referred to as a TID), (d) the unique brand identifier associated with the chip supplier, and (e) a variable counter associated with the chip 202 and indicating its position in a production run. Other data may also be stored on the blockchain ledger related to the chip 202, which may be provided along with the RFID chip 202 to the chip recipient from the trusted chip manufacturer or supplier, all of which may, in an exemplary embodiment, be associated with timestamp and location information recorded in the blockchain ledger. The IC chip 202 may then be shipped, which may add a shipping event to the blockchain ledger or may update an associated shipping ledger, such as may be desired.

Once the chips 202 have been manufactured and delivered from the chip supplier, the chips 202 may then be integrated into label rolls, as explained more fully below. Nonetheless, it is also contemplated that each of these steps may be performed by the same entity or by different entities, such as may be desired. For example, according to an exemplary embodiment, RFID labels may be manufactured into rolls such that the chips 202 are integrated into each label on the roll. As part of this manufacturing process, and as explained more fully below, additional information may be added to the blockchain for each RFID tag in each label on the roll. Such additional information may include, for example, a unique roll ID for each roll of labels, an indication of whether the chip or label has been tested as being functional or nonfunctional (i.e., "good" or "bad") or whether the chip or label has been tested as having an acceptable degree of functionality if multiple degrees of functionality are desired, as well as any other information that may be necessary in order to account for all of the integrated circuit devices used in the manufacturing of the labels. As previously stated, it is also contemplated that the chips 202 may be tested prior to their integration with the labels, such that functional chips can be identified and used, and so that nonfunctional chips can be identified and disposed of. Additionally, each blockchain associated with each chip 202 may be updated, such that the blockchains associated with defective or nonfunctional chips identify those chips as defective or nonfunctional.

Returning now to FIG. 2 and by way of further example, the chips 202 may be incorporated into a roll of inlays 204. It is contemplated that, during this process, not all of the received IC chips 202 will successfully be incorporated into the inlay 204. For example, it is contemplated that some of the received IC chips 202 may be defective and/or may not be used (or even may be lost/undelivered). According to an exemplary embodiment, the shipping events of the ledger may be updated to show which IC chips 202 have been received, waste chip ledgers may be created or updated in order to reflect the defective or missing IC chips 202, and other ledgers may be updated as appropriate.

Further, once the labels are manufactured in the form of rolls, the rolls may be assembled into cartons and the cartons assembled into pallets, which may then become the final product shipped to a customer for use with the end product. Further, the RFID tags may be associated with a roll ID associated with the roll of the RFID tag labels, which may be mapped to a particular carton ID based on the carton to which the roll has been added, which may in turn be mapped to a particular pallet ID based on the pallet to which the carton was added. The addition of these values to the blockchains associated with each RFID tag may allow information about the RFID tag to be tracked back to the initial chip ID and wafer ID, should it become necessary to verify the production process of the RFID chip all the way back to the trusted manufacturer or supplier of the labels. This lookup process may likewise be usable in a reverse fashion, such that a roll ID may be associated with a specific set of integrated circuits on the roll, thereby allowing the roll ID to be used in order to identify exactly which RFID chips have been used to form that roll of labels. If, for example, a roll has a particularly high defect rate, the defect rate may be identified and traced back to the supplier of the roll. Likewise, if a roll has a particularly low defect rate, the process allows that supplier to be identified and prioritized for future orders, etc.

In a next step, a plurality of labels 206 may be produced from the inlay 204, and may be printed or cut at this stage. Alternatively, further finishing or cutting steps may be performed at a later stage in the process, such as may be desired. Further, some of the RFID labels 206 may be identified as being unreadable or defective even after passing the previous stage, and such labels 206 may be identified and removed as appropriate, with the respective blockchain ledgers corresponding to those labels 206 being updated accordingly.

In a next step 208, the labels 206 may be provided to a customer in a desired format and finalized. For example, labels 206 may be provided in a blank or partially printed form, and the customer may perform additional printing or processing to finalize the labels 206. In an exemplary embodiment, the customer may print and encode each of the received labels 206, also encoding location information therein as may be appropriate or desired to suit user need and/or preference.

Additionally, once the customer or other recipient has received labels 206, the customer may verify receipt of the labels through the blockchain ledgers associated with each label 206. Verification ensures that the production and shipment history of the label 206 is fully traceable from the initial stages of production of the chip to the customer of the label. It is also contemplated to have situations wherein the labels 206 are only partially completed, or are finished elsewhere, which may also be specified in the production and shipment history of the label. For example, it may be desirable to provide blank labels, intended to be printed upon later or intended to be integrated within a product without any sort of printing being applied thereto, to one customer, while in another case it may be desirable to provide the customer with labels 206 that have already been printed upon and/or encoded prior to shipment. In such cases, wherein the labels may be printed and encoded prior to shipment, additional information such as the electronic product code (EPC) of the RFID may be integrated with the blockchain at this stage, as may be desired. For example, the EPC may be added to the label blockchain ledger prior to the label being associated with a roll ID, a case ID, and so forth.

Figure 3:
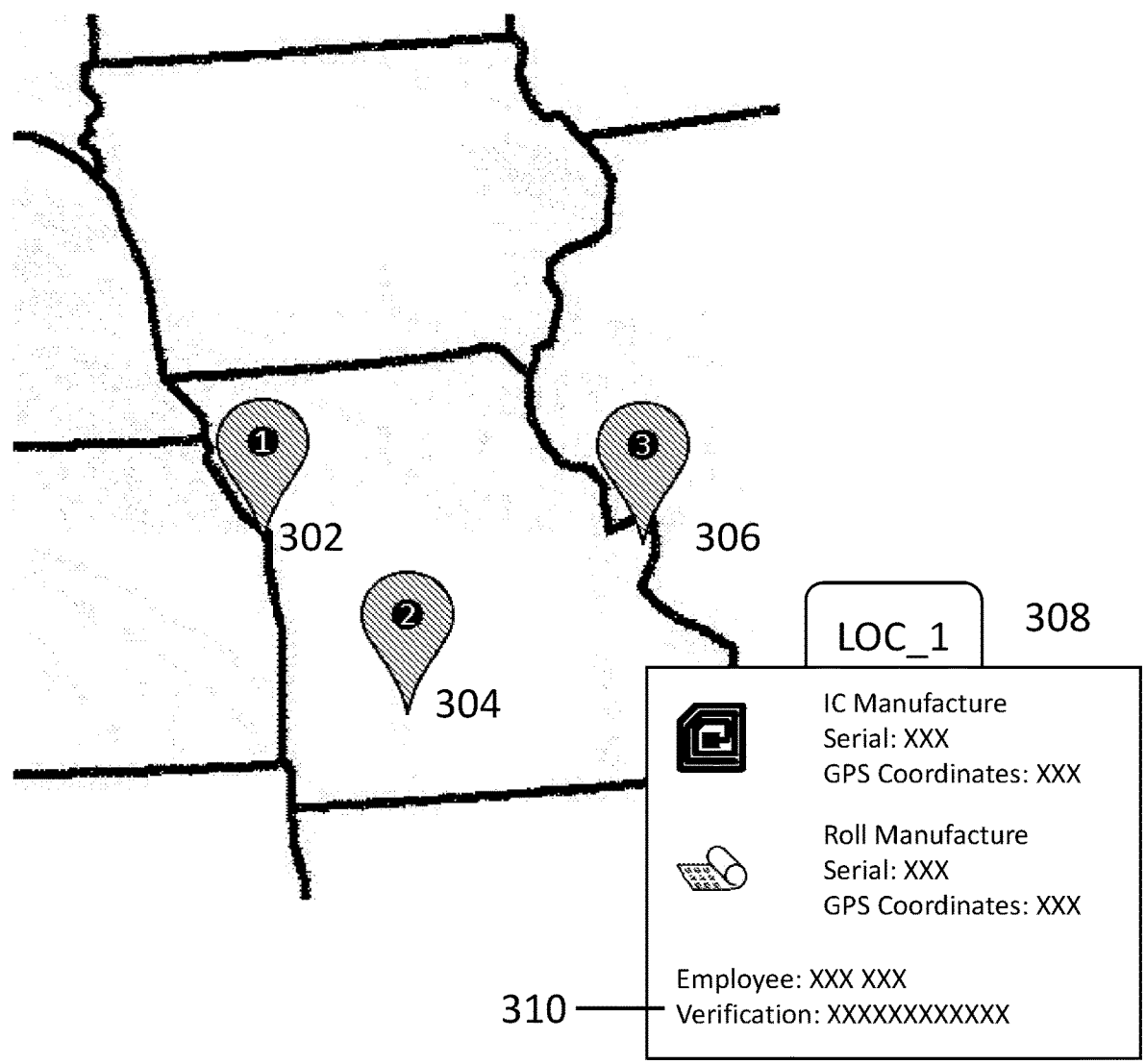
FIG. 3 is an exemplary embodiment of a map showing the geographic location information associated with a fork chain ledger, which may be accessible by a user using a user interface.

FIG. 3 shows an exemplary embodiment of a map showing the geographic location information associated with a fork chain ledger 300, which may be accessible by a user (not shown) through a user interface. According to an exemplary embodiment, each location in which the product or a portion of the product has been manufactured, sold, and/or distributed may be indicated as part of the ledger, and a user may be able to display this information as part of the resulting map.

For example, once the customer (or production facility or other destination) has received the rolls of labels 206, the location to which the labels were shipped may first be integrated into the blockchain ledger for each label. The location information may be, for example, a GPS location of the facility or a mailing address, or any other geographical identifier as may be desired. It is also contemplated that the customer may have multiple locations in which the pallets of labels 206 may be shipped. For example, if the customer has a variety of end locations to which the labels may be shipped, the shipment of the labels to these locations may be tracked via blockchain, and each of the customer's locations may host a secure node that may be used to read the product, and verify the receipt of the product and the location of receipt.

By way of further example, the map featured in FIG. 3 may show a product which has been manufactured and distributed within the state of Missouri. The map may track the path of the product, and its predecessor raw materials, through three different locations, marked as "1," "2," and "3" on the map, in this case corresponding roughly to Kansas City, Springfield, and St. Louis, and corresponding to reference numerals 302, 304 and 306 respectively.

A summary 308 of the activity grouped under location 1 (302) may be provided to a user as part of the mapping interface, and in this example is shown in the bottom right hand corner of the map. According to an exemplary embodiment, the fork chain ledger 300 associated with a particular product may indicate that a company based in location 1 (302) manufactured the RFID chip, and the inlay in which the chips were disposed, and the verification of a particular employee 310 may be associated with this data. Each of the other locations shown on the map, namely location 2 (304) and location 3 (306) may also be selected to provide similar type information when selected. For example, location 2 (304) may represent a shipping terminal, and location 3 (306) may represent a retail location at which the product was sold.

Such a system may also support product status inquiries during production. For example, after a particular roll or carton has been scanned and associated with GPS coordinates, it may be represented on the map after being added to the fork chain ledger associated with the roll. This may, for example, provide an indication to a downstream retailer as to which products are where and in what quantity. Upstream manufacturers may also be able to verify which products properly reached their destinations, thereby allowing those manufacturers to address any issues involving transportation if any should exist.

Further, once the pallet has reached the end location, it may be desirable to have a specific employee (or employees) of the company be responsible for inspecting the labels 206 and updating the blockchain ledgers associated with each label. According to an exemplary embodiment, it is also contemplated that the company may have specific devices (e.g., an automated receipt process), which may be able to inspect the labels and update the blockchain ledgers accordingly. In an exemplary embodiment, a blockchain ledger may be updated to show the identifying information for a particular authorizing employee, which may update the ledger to show, for example, "Received—Employee 306. In such an exemplary embodiment, once the case ID, pallet ID, and/or roll ID is received, one of the identifiers (such as a roll ID) may be transferred to this individual ID for the employee such that the roll ID or other identifier can be tracked via the blockchain ledger. Individual label IDs may also be directly transferred or may be updated directly to include the employee ID information, or may instead simply inherit it from the roll ID information or other identifying information.

Figure 4:
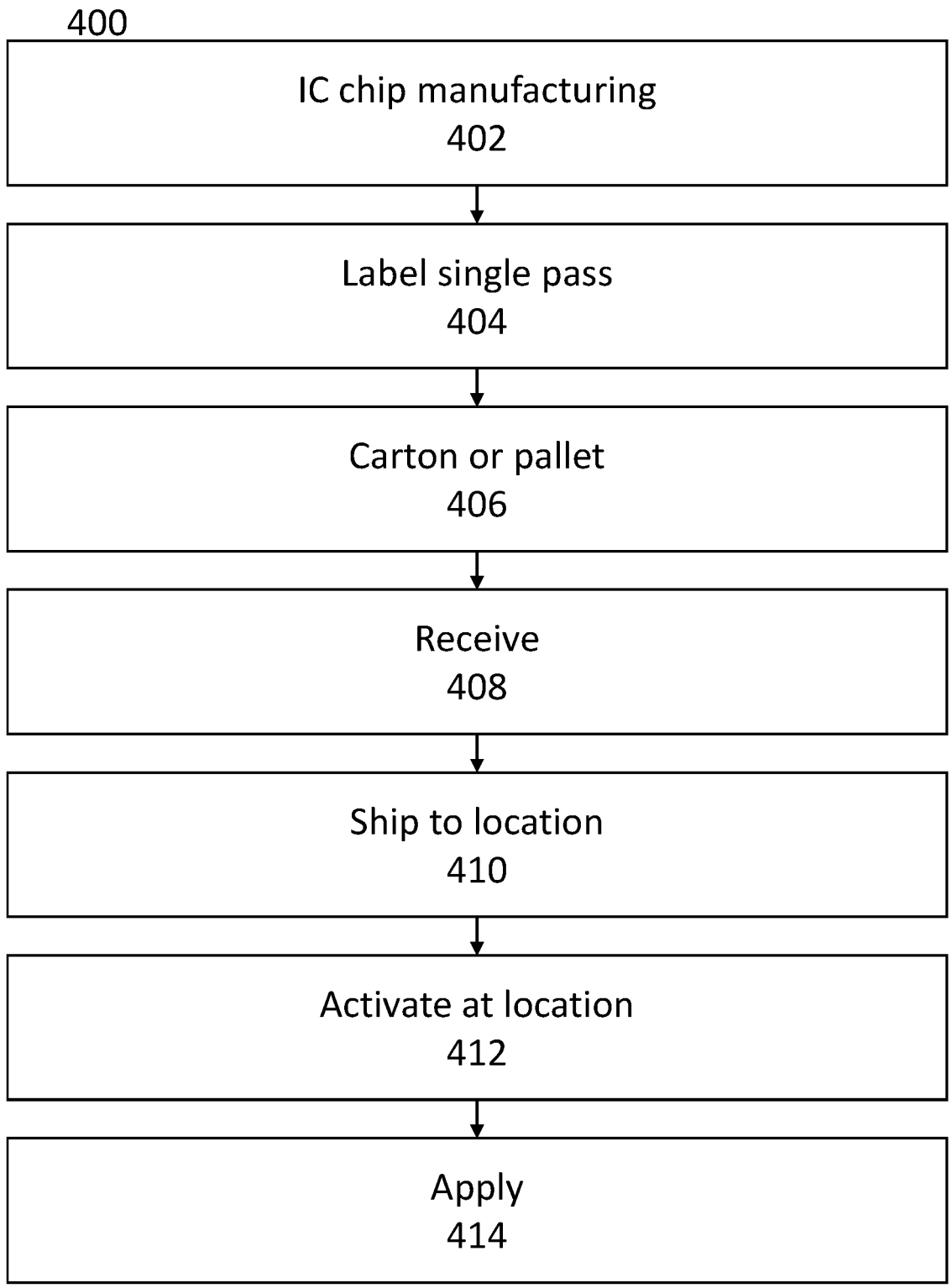
FIG. 4 is an exemplary embodiment of a process flow diagram for a fork chain system in accordance with the disclosed architecture.

FIG. 4 displays an exemplary embodiment of a process flow diagram for a fork chain system 400 of the present invention, from an initial manufacturing step for an RFID label 402 to a final step of applying the label to a particular product 414, after which the product (rather than the label) may be tracked, as may be desired. More specifically, at step 402, an IC chip may be manufactured, which may result in certain information being added to a cloud based blockchain ledger associated with the chip, such as a batch ID, a wafer ID, a TID (and any other identification information), an intended shipping destination, and a chip counter indicating the IC chip's position in a production run, as may be desired. Specifically, in an exemplary embodiment of the manufacturing process, a set of wafers/chips may be produced with a unique TID and a unique brand ID (or BID) on the die. Each wafer may also have a unique wafer ID associated therewith, along with any other identifying information that may be appropriate. Such identifying information may be provided as unalterable data in the chip.

In a next step 404, a label roll may be initially prepared by, for example, integrating the IC chips produced in the previous step 402 into an inlay or roll of inlays. According to an exemplary embodiment, this roll may then be updated to provide a roll ID as well as a TID/BID of chips within the roll, and mapping information. Specifically, in step 402, the TID of the chips used in manufacturing the roll may be tracked and recorded, and waste material may be contained. For example, bad product may be identified through an appropriate testing method, and defective products may be eliminated. Therefore, each roll may be provided with a unique ID and an association with all known good labels in the roll. This information may then be provided in the form of a roll ledger, which may contain the TID/BID of the good labels. Likewise, a waste ledger may also be created in order to keep track of all of the bad or defective chips that needed to be discarded, or that otherwise went unused or missing.

In a next step 406, the rolls may be assembled into a carton and/or a pallet, and the roll IDs of the rolls in the cloud blockchain roll ledger may be associated with the carton ID and stored within a cloud blockchain carton ledger (along with a GPS location if so desired), and the carton ID may then be stored in a pallet ledger along with a pallet ID, a customer ID, and a supplier ID, along with any other information as may be desired.

In a next step 408, the pallet, once shipped, may be received and the receipt may be recorded in a receipt ledger. More specifically, the receipt ledger may store, without limitation, a data and time of receipt, a received pallet ID, a carton ID for each carton on the pallet, a GPS location or other location information, as well as a supplier ID indicating the point of origin of the product. As such, once the customer receives the pallet or carton, the system may log the GPS location of the customer's site of receipt (or other location information) in order to tie it to a specific receipt log.

In a next step 410, a shipment ledger may also be created, identifying how the pallet has been shipped to the customer. In an exemplary embodiment, it is contemplated to have step 410 provided as part of an initial shipment phase, such that, rather than having the customer receive all pallets at a single location, multiple pallets may be shipped to multiple different sites for the same customer, if so desired. The shipment ledger may include, without limitation, a pallet ID, a case ID, a location ID (which may be obtained by GPS), or any other identification information as may be desired.

In a next step 412, as the pallets are received at the desired location, they may be activated at said location. According to an exemplary embodiment, upon receipt at an application location, the location may receive the pallet and scan the shipment, thereby causing a GPS location to be captured. Finally, at step 414, the labels may be printed, encoded, and/or applied to the corresponding products. For example, in a printing step and then an encoding step (or a printing and encoding step if both are to be performed by the same device), a printer may be activated and may be tasked with printing label material on a roll. The labels may then be encoded. As part of this process, the roll ID for each of the label rolls that may be fed into the printer may be scanned, and each of the TIDs of the individual labels may be read, so that each can be validated. The printer may then encode a GPS location (or other geo-location information) when encoding the RFID in the label, along with a printer ID, which may be added to a printer ledger or label ledger, such as may be desired. By way of example, a printer ledger may include, without limitation, a printer ID, a roll ID, the TID/BID of each label associated with the roll that passes through the printer, a counter value for the number of labels that pass through the printer, a GPS location, an encoded EPC, and any other data that may be desired.

In a final application step, a label may be applied and associated with a particular product. Activation may be manual, such that the label may be read by a trusted employee after being applied or may even be hand-applied by the trusted employee. The employee may read and scan the label, adding a verification to a cloud blockchain associated with the label, in order to properly activate it. Subsequent updates to the location of the product may then be added to the blockchain based on later access, and as so desired.

In relation to the trusted application of the label to a particular product, once a specific roll ID ownership value is assigned or transferred to an individual ID, the individual may then encode certain further information on the blockchain ledgers, optionally with specific hardware, and optionally after performing certain other actions such as may be desired. For example, an individual may first use a dedicated hardware system in order to verify the accuracy of each roll ID, as well as any other details stored on the blockchain. The same dedicated hardware system may also be used in order to perform chip testing, and each RFID tag encoded in each label, or some appropriate selection of RFID tags in the label roll, may be tested in order to ensure that the RFID tags can be properly read. Damaged or defective RFID tags may be removed from the process, and the blockchain updated accordingly.

According to an exemplary embodiment, a customer hardware system may incorporate a printer, which may be used to print any variable information on the labels that may be desired. For example, if the labels are blank, the printer may be used to print any and all information on the labels that may be desired. Alternatively, variable information may be printed on just a portion of the labels in order to supplement unchanged information provided on the labels since the previous step, if the labels were prepared in this manner in the previous step. The label printer used by the customer may also be connected to an encoder or another hardware device configured to record the variable data in the blockchain ledgers.

The customer hardware system may further include an encoder, which may be used to encode information in the RFID tag of the label. The encoder may be provided before or after the printer, or may be provided concurrently with the printer in that some printer tasks may be performed beforehand or afterward. For example, labels may be printed upon, encoded, and separated from the web if provided in a continuous format. The encoded information may then be stored in the blockchain ledger in some form. For example, all of the encoded information may itself be stored in the blockchain ledger, which may allow for the information to be easily accessed by tracing the product's history. In another embodiment, only a selection of the encoded information, or an indication that the information has been successfully encoded, may be stored in the blockchain.

The customer hardware system may also include a location encoder, which may encode the location at which the label was printed and encoded. The location encoder may be part of the encoder, or may be a separate device. According to an exemplary embodiment, the location encoder may make a live retrieval of the current location with every encoding (e.g., via GPS), or may encode a predetermined location. For example, in one embodiment, the address of the factory may be encoded; whereas, in another embodiment, a pre-recorded GPS coordinate or other location indication may be encoded without such location being checked first. The encoded location may then be added to the blockchain ledger, along with the other information associated with the RFID label, in such a manner as to tie it to both the roll ID (and/or the individual label ID) and the individual ID of the customer employee.

According to an exemplary embodiment, it is also contemplated to have a combination printing and encoding machine, or a machine that performs some combination of printing and encoding. The combination printing and encoding machine may perform the functions of printing, data encoding, and/or location encoding after verifying the individual ID and the roll ID to ensure that each was proper.

According to an exemplary embodiment, it is also contemplated that a customer may be making use of already printed labels (e.g., printed labels that have not yet been encoded), already encoded labels (e.g., encoded labels that have not been printed or which do not feature a finalized print), and/or labels that have already been printed and encoded. It is contemplated that printing and encoding may be performed as a part of the manufacturing of the roll, if desired. Alternatively, it is contemplated to have a service bureau or other intermediate company perform the labeling and printing, as may be desired. Further, if a service bureau performs any of the intermediate steps, such information may also be indicated on the blockchain in a similar matter to the method previously discussed to ensure full accountability at each step in the supply chain.

Once the customer has completed the printing and encoding process, an authorized individual at the customer (who may be, for example, a trusted employee of the manufacturing company) may apply the digital identity to the physical product. In one exemplary embodiment of a fork chain system, the rolls may be fully traceable up until this point, with the rolls being assigned to this employee and validated by the printer and encoder machine node. After this point, the focus may be on the individual labels, as the labels may be applied to the actual physical products with which they will be associated, and incorporating such information into the blockchain ledger associated with each product. Chain of custody protocols could also be used to ensure that all of the labels are accounted for as part of the process to maintain integrity of the system. User IDs, hardware encryption or other authentication details can also be used.

Figure 5:
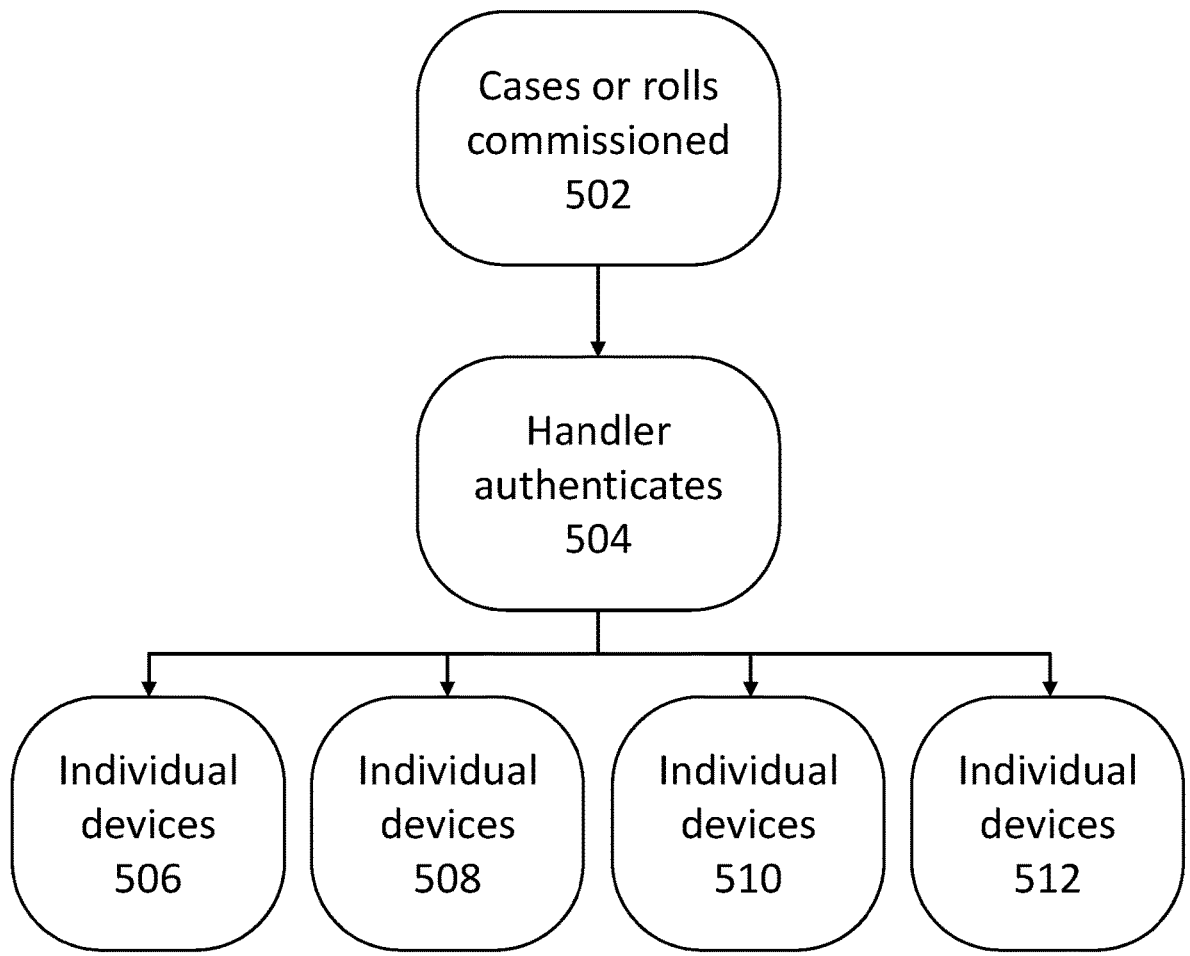
FIG. 5 is an exemplary embodiment of a process flow diagram for a verification system in accordance with the disclosed architecture.

FIG. 5 is an exemplary embodiment of a process flow diagram for a verification system 500 of the present invention. According to an exemplary embodiment, once the cases or rolls have been commissioned at step 502, the same may be authenticated by a handler at step 504, through some method of authentication or multi-factor authentication. For example, authentication may include, without limitation, biometric authentication, a password, a physical authentication device, or any other suitable authentication device or technique. GPS information may also be associated with an authenticated product at this step. The information may then be read by a plurality of individual devices 506, 508, 510, 512 further down the supply chain, such as a printer, an automated applicator, a hand application tool, or any other devices which may interact with the product or with the blockchain, as may be desired. Such a process may, as discussed above, be used to connect the roll ID for the roll of labels, the tag ID for an individual tag, the GPS locations that the two had been taken through, the authentication key (e.g., a biometric authentication key), and the timeline of transfer of ownership, in order to allow this information to be used to authentically connect digital identifiers to physical items.

In order to ensure that the physical products are properly associated with the RFID tag and with the blockchain ledger associated with that RFID tag, an exemplary embodiment of the fork chain system may have a process for incorporating the two. For example, once a particular physical product is assigned a specific label, or during the manufacturing process, a final time stamp may be applied to the blockchain ledger associated with the RFID tag of the label, corresponding to the time at which the tagged product was scanned and read during the manufacturing process or a time immediately after labeling. This final timestamp may provide for the traceability of the label all the way back through the label supply chain, to the first production of the integrated circuits.

Once this has occurred, the manufacturer may, upon reading the tagged product and time stamp, create a verification report so as to provide the product with a cohesive digital identity. For example, according to an exemplary embodiment, a verification report may include verification of one or more of, or all of, the following: (a) that the labels have come from a trusted source, (b) that the commissioned labels have been provided to the correct manufacturing location, (c) that the labels have been updated by a trusted employee, (d) that the labels have been properly encoded at a defined location, (e) that the labels have been applied to a product at a defined location (by geolocation or otherwise) as overseen by the trusted employee, and (f) that the product's digital identity has been finalized and activated for downstream supply chain uses.

Once this persistent digital identity has been created, others may be able to add to the blockchain ledger associated with a particular product. For example, once the product has an activated digital identity, it may be updated with timestamp and location information showing that it has been provided to a retailer, timestamp and location information of an original purchase by a first party, information showing that the first party donated the product to, for example, a consignment store, information showing that it was then purchased from the consignment store by a second party, and so on and so forth. In some cases, a product having a digital identity may be updated even though it hasn't changed hands. For example, a digital identity of a product may be updated if it is returned or exchanged (e.g., clothing of an improper size), or may even be updated when it is taken to particular places (e.g., a user that travels to a foreign country may have their products "check in" to those foreign countries to show where the products have previously been).

In an exemplary embodiment, the blockchain ledger associated with a particular RFID tag in a label may also be combined with a pre-existing blockchain associated with a product, or with any other component of the process. For example, a particular product may be designated by a blockchain ledger as being associated with the raw materials used to make the product. Further, companies providing transportation or labor may also have their own blockchain ledgers indicating what was done and when, which may be reconciled with the blockchain ledger of the RFID tag and/or of the raw materials.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of implementing a blockchain-based fork chain system to track a product comprising:
    manufacturing a radio frequency identification (RFID) label;
    integrating records pertaining to an RFID inlay in the RFID label into a blockchain ledger;
    inputting a physical location of the RFID label into the blockchain ledger;
    encoding information into the blockchain ledger comprising information pertaining to the accuracy of the RFID label;
    applying a time stamp to the blockchain ledger once a product is assigned with the RFID label; and
    combining the blockchain ledger with a second blockchain ledger.

2. The method of implementing the fork chain system of claim 1 further comprising creating a verification report for the product upon reading the product assigned with the RFID label and the time stamp.

3. The method of implementing the fork chain system of claim 2 further comprising creating a digital identity for the product on creation of the verification report.

4. The method of implementing the fork chain system of claim 3 further comprising updating the digital identity of the product.

5. The method of implementing the fork chain system of claim 1, wherein the manufacturing of the RFID label comprises manufacturing a plurality of RFID chips, assembling the plurality of RFID chips into a roll inlay, assembling the roll inlay into a carton, and assembling the carton into a pallet.

6. The method of implementing the fork chain system of claim 5 further comprising updating the blockchain ledger with information about at least one of the roll inlay, the carton, and the pallet.

7. The method of implementing the fork chain system of claim 5 further comprising testing the plurality of RFID chips for defects.

8. The method of implementing the fork chain system of claim 1, wherein a global positioning system is used to determine the location of the RFID label.

9. The method of implementing the fork chain system of claim 1, where encoding information into blockchain ledger includes inputting at least one of the following attributes of the RFID label: (a) a batch identifier; (b) a wafer identifier; (c) a tag identification memory; (d) a brand identifier; and (e) a variable counter.

10. The method of implementing the fork chain system of claim 2, wherein creating the verification report comprises at least one of the following confirmations: (a) that the RFID label came from a trusted source; (b) that the RFID label has been provided to a correct location; (c) that the RFID label has been updated by a trusted party; (d) that the RFID label has been properly encoded; (e) that the RFID label has been applied to a product at a defined location; and (f) that the RFID label has been activated.

11. The method of implementing the fork chain system of claim 1, wherein the second blockchain ledger is associated with one of the following attributes of the product: (a) a raw material; (b) a source of the raw material; (c) a source of labor; and (d) a source of transportation.

12. The method of creating the fork chain system of claim 1 further comprising shipping the RFID labels and creating a receipt ledger.

13. The method of creating the fork chain system of claim 1 further comprising testing the RFID chip for a defect and creating a waste ledger.

14. The method of implementing the fork chain system of claim 4 further comprising updating the blockchain ledger with information about at least one of the roll inlay, the carton, and the pallet.

* * * * *